United States Patent
Lehman et al.

(10) Patent No.: US 11,116,358 B2
(45) Date of Patent: Sep. 14, 2021

(54) MOVEABLE DOOR FOR VERTICAL COOKING GRILL

(71) Applicant: Manitowoc FSG Operations, LLC, New Port Richey, FL (US)

(72) Inventors: Lon Lehman, Ft. Wayne, IN (US); Eugene Tippmann, Ft. Wayne, IN (US)

(73) Assignee: MANITOWOC FSG OPERATIONS, LLC, New Port Richey, FL (US)

( * ) Notice: Subject to any disclaimer, the term of this patent is extended or adjusted under 35 U.S.C. 154(b) by 889 days.

(21) Appl. No.: 15/864,333

(22) Filed: Jan. 8, 2018

(65) Prior Publication Data

US 2018/0125291 A1    May 10, 2018

Related U.S. Application Data

(63) Continuation of application No. 14/522,466, filed on Oct. 23, 2014, now Pat. No. 9,861,229.

(60) Provisional application No. 61/894,632, filed on Oct. 23, 2013.

(51) Int. Cl.
     *A47J 37/06*      (2006.01)

(52) U.S. Cl.
     CPC ................... *A47J 37/0611* (2013.01)

(58) Field of Classification Search
None
See application file for complete search history.

(56) References Cited

U.S. PATENT DOCUMENTS

| | | |
|---|---|---|
| 1,121,470 A | 12/1914 | Bushnell |
| 1,814,942 A | 7/1931 | Mabey |
| 2,094,862 A | 10/1937 | Welch |
| 2,552,135 A | 5/1951 | Bertino |
| 3,853,112 A | 12/1974 | Lazaridis et al. |
| 3,948,244 A | 4/1976 | Lazaridis et al. |
| 3,968,787 A | 7/1976 | Basiulis |
| 4,066,862 A | 1/1978 | Tippmann |
| 4,149,840 A | 4/1979 | Tippmann |
| 4,224,864 A | 9/1980 | Wendell |
| 4,245,147 A | 1/1981 | Cummings et al. |
| 4,299,060 A | 11/1981 | Tippmann |
| 4,421,015 A | 12/1983 | Masters |
| 4,547,995 A | 10/1985 | Tippmann |
| 4,604,949 A | 8/1986 | Giese |

(Continued)

FOREIGN PATENT DOCUMENTS

| | | |
|---|---|---|
| JP | H07-289444 A | 11/1995 |
| JP | 2004-209161 A | 7/2004 |
| KR | 10-0364682 A | 12/2002 |

OTHER PUBLICATIONS

International Search Report and Written Opinion of the International Searching Authority; PCT/US2009/064388; dated Jun. 28, 2010.

*Primary Examiner* — Ibrahime A Abraham
*Assistant Examiner* — Elizabeth M Sims
(74) *Attorney, Agent, or Firm* — Ohlandt, Greeley, Ruggiero and Perle, LLP

(57) ABSTRACT

The disclosure provides a movable door that directs debris, such as oil, grease, and food particles, that falls from a plurality of cooking slots in a vertical cooking grill to an area separate from a food product delivery tray, providing a cooked food product with reduced calories that is potentially more visually appealing.

13 Claims, 4 Drawing Sheets

(56) References Cited

U.S. PATENT DOCUMENTS

| | | |
|---|---|---|
| 4,767,581 A | 8/1988 | Tippmann |
| 4,864,788 A | 9/1989 | Tippmann |
| 4,955,361 A | 9/1990 | Sotani et al. |
| 4,970,949 A | 11/1990 | Ferrara, Jr. et al. |
| 5,004,617 A | 4/1991 | Bowen et al. |
| 5,086,693 A | 2/1992 | Tippmann |
| 5,201,364 A | 4/1993 | Tippmann et al. |
| 5,203,258 A | 4/1993 | Tippmann et al. |
| 5,235,903 A | 8/1993 | Tippmann |
| 5,318,792 A | 6/1994 | Tippmann |
| 5,411,753 A | 5/1995 | Tippmann |
| 5,522,310 A | 6/1996 | Black |
| 5,549,040 A | 8/1996 | Naramura |
| 5,552,172 A | 9/1996 | Liebermann |
| 5,584,231 A | 12/1996 | DeLeon |
| 5,639,498 A | 6/1997 | Bakosch |
| 5,655,434 A | 8/1997 | Liebermann |
| 5,662,959 A | 9/1997 | Tippmann |
| 5,680,810 A | 10/1997 | Sham |
| 5,716,657 A | 2/1998 | Liebermann |
| 5,767,487 A | 6/1998 | Tippmann |
| 5,862,747 A | 1/1999 | Handel |
| 5,921,172 A | 7/1999 | Kiczko et al. |
| 5,939,125 A | 8/1999 | Tippmann |
| 5,960,869 A | 10/1999 | Tippmann |
| 5,980,966 A | 11/1999 | Handel |
| 5,990,452 A | 11/1999 | Shelton |
| 5,993,878 A | 11/1999 | Tippmann |
| 6,062,129 A | 5/2000 | Tippmann |
| 6,103,289 A | 8/2000 | Tippmann |
| 6,145,431 A | 11/2000 | Tippmann et al. |
| 6,152,024 A | 11/2000 | Tippmann |
| 6,263,963 B1 | 7/2001 | Tippmann |
| 6,498,329 B1 * | 12/2002 | Gibernau ............... G07F 9/105 |
| | | 219/753 |
| 6,539,839 B1 | 4/2003 | Tippmann |
| 6,639,187 B2 | 10/2003 | Arel et al. |
| 6,753,025 B1 | 6/2004 | Tippmann |
| 7,217,906 B2 | 5/2007 | Veltrop |
| 7,348,519 B2 | 3/2008 | Federspiel et al. |
| 7,530,473 B2 | 5/2009 | Chirnomas |
| 7,538,300 B1 | 5/2009 | Tippmann, Jr. et al. |
| 7,677,160 B2 | 3/2010 | Tippmann, Sr. et al. |
| 8,367,977 B2 * | 2/2013 | Lehman ................. A47J 27/04 |
| | | 219/386 |
| 2005/0109218 A1 | 5/2005 | Arnedo et al. |
| 2005/0204927 A1 | 9/2005 | Boyle et al. |
| 2006/0137541 A1 | 6/2006 | Tippmann et al. |
| 2006/0261056 A1 * | 11/2006 | Veltrop ................. A47J 37/08 |
| | | 219/521 |

* cited by examiner

MOVEABLE DOOR FOR VERTICAL COOKING GRILL

CROSS-REFERENCE TO RELATED APPLICATIONS

This application is a Continuation application of U.S. patent application Ser. No. 14/522,466, filed on Oct. 23, 2014, and claims the benefit of priority to U.S. Provisional Patent Application No. 61/894,632, filed on Oct. 23, 2013, the entire contents of which are hereby incorporated by reference in their entirety.

TECHNICAL FIELD

This disclosure relates to vertical cooking grills.

BACKGROUND

Vertical cooking grills provide a compact arrangement for efficient, high-volume cooking of food. During the cooking process, oils or grease from the cooked food flows downward onto an exit door of the grill and then onto a tray that receives cooked food.

SUMMARY

This disclosure provides a cooking unit, comprising a food product delivery area, a cooking slot, and a door. The cooking slot includes an upper opening and a lower opening. The door is positioned between the food product delivery area and the lower opening of the cooking slot. The door is movable between a first position to block a direct path from the cooking slot to the food product delivery area, and a second position where a path is provided for food product to move from the cooking slot to the food delivery area. In the first position the door includes an angled surface that is at an angle with respect to a horizontal direction and the angled surface extends continuously from a first door support location to a second door support location.

This disclosure also provides a cooking unit comprising a food product delivery area, a cooking slot, a movable first door support, a fixed second door support, and a door. The cooking slot includes an upper opening and a lower opening. The movable first door support is movable between a first position and a second position. The door is positioned between the food product delivery area and the lower opening of the cooking slot. The door is secured to the first door support and supported by the second door support such that when the first door support is in the first position, the door blocks a direct path from the cooking slot to the food product delivery area, and when the first door support is in the second position, the door is positioned to un-block the direct path from the cooking slot to the food product delivery area. The door includes a free end that moves in a direction that is away from the first door support as the first door support moves from the first position to the second position.

Advantages and features of the embodiments of this disclosure will become more apparent from the following detailed description of exemplary embodiments when viewed in conjunction with the accompanying drawings.

DETAILED DESCRIPTION

Figure 1:
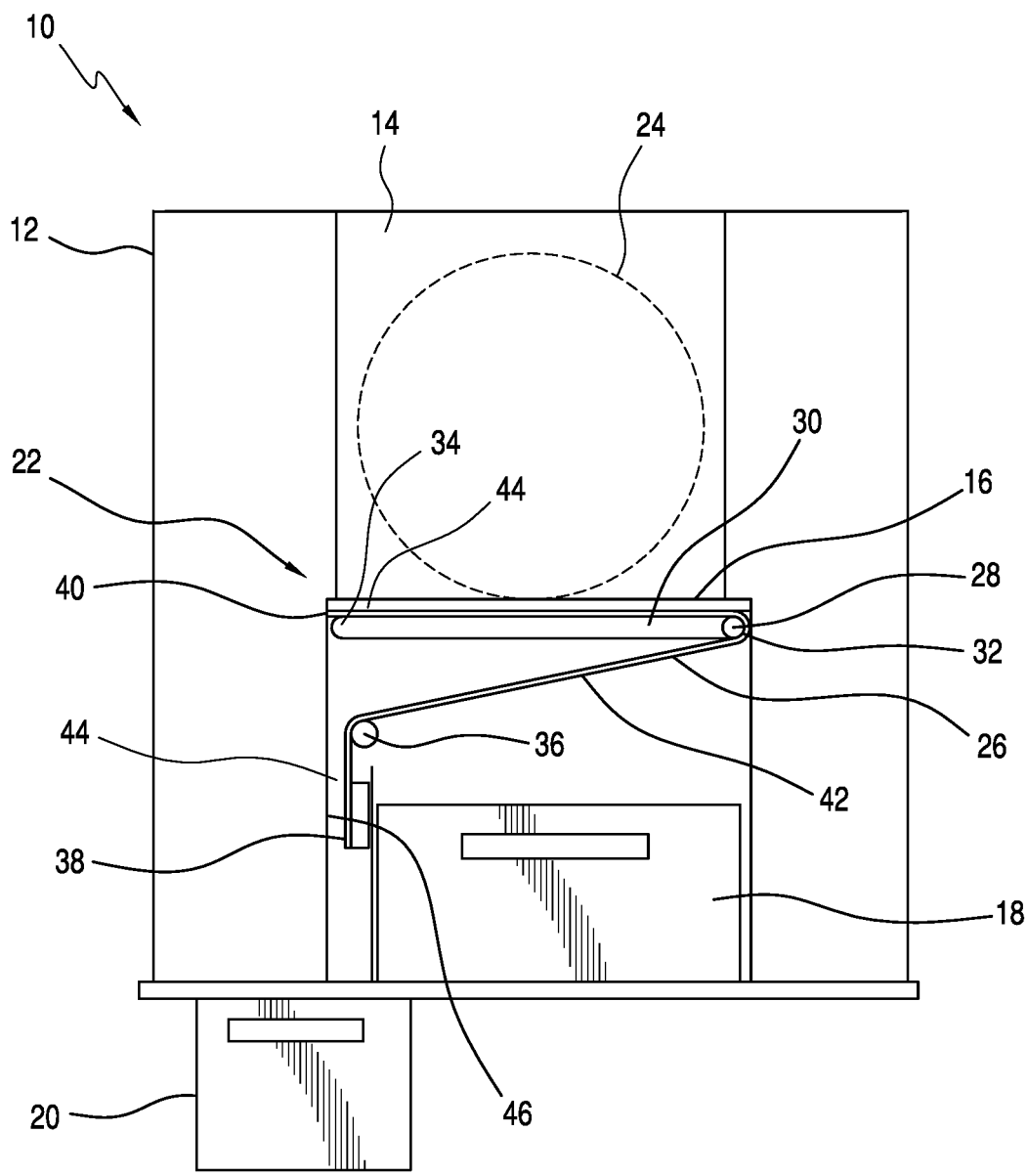
FIG. 1 is a front view of a vertical grill with a moveable door in position during a cooking operation of the vertical grill.
Figure 2:
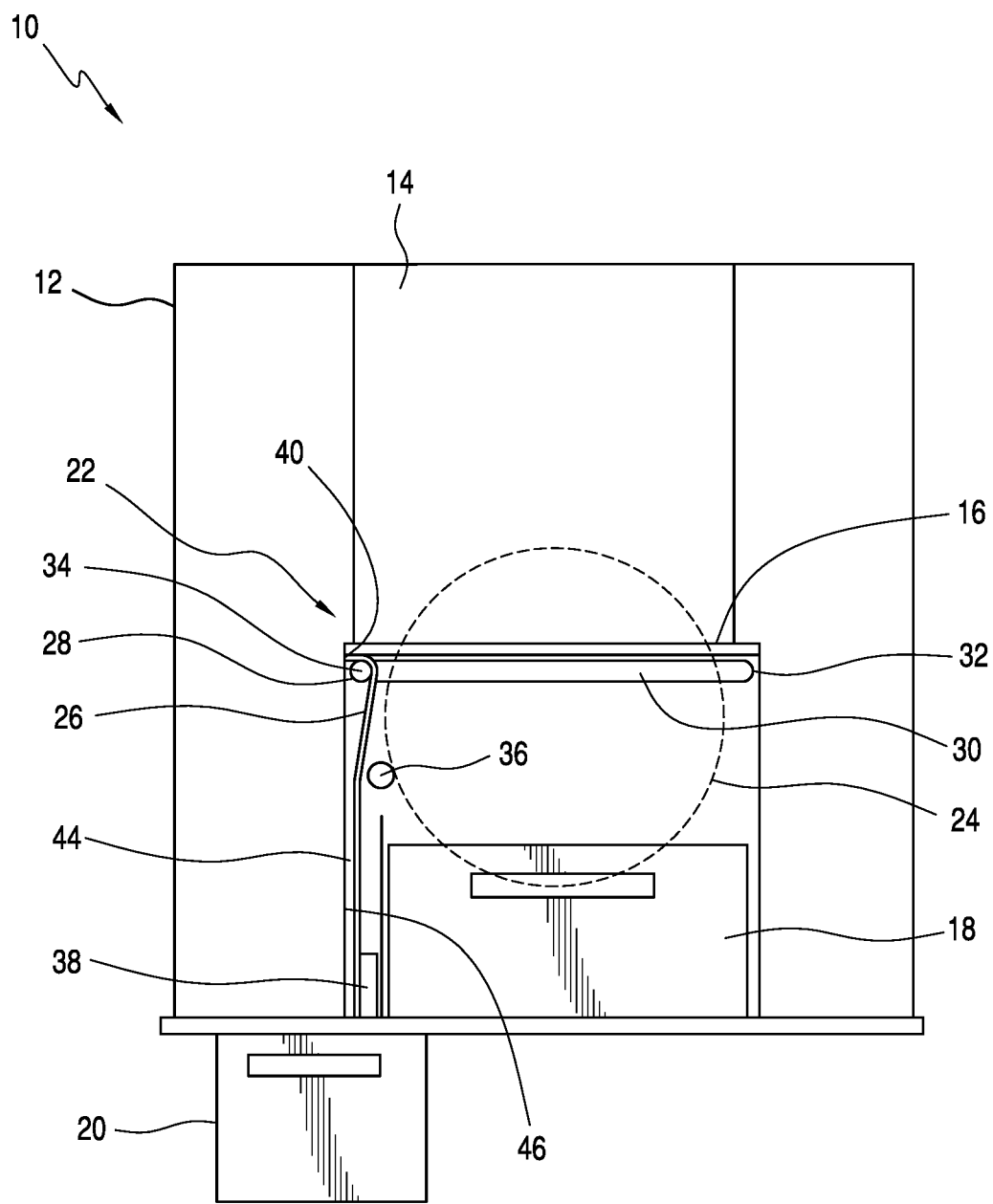
FIG. 2 is a front view of the vertical grill of FIG. 1 with the moveable door retracted to permit unloading of a food product from the vertical grill.

Referring to FIGS. 1 and 2, a vertical cooking grill or unit is shown and generally indicated at 10. Vertical cooking grill 10 is typically used in environments requiring high volumes of cooked food or food product, such as in cafeterias, fast food restaurants, and the like. While vertical cooking grills provide many advantages in fast, efficient cooking of food product, one challenge with vertical grills is separating oil or grease from cooking food from the cooked food during a delivery process. In current vertical grills, oil and/or grease from cooking food product falls vertically onto a food product delivery tray or feature. Thus, when cooked food product is released to the food product delivery tray, the cooked food product falls directly into the oil, grease, and other debris that is a byproduct of the cooking process. The debris falling in such a manner is often seen as contamination, either adding an undesirable visual appearance to the cooked food product or adding unnecessary and undesirable fat calories to the cooked food product. The movable door of the present disclosure directs some or all of the debris, such as oil, grease, and food particles, to an area separate from the food product delivery tray, providing a cooked food product with reduced calories that is potentially more visually appealing.

Vertical cooking grill 10 includes a housing 12 in which are positioned a plurality of cooking slots 14, a trap door 16, a food product delivery tray, finished product receiving area, or food product delivery feature 18, a grease pan 20, and a movable door system 22. Vertical cooking grill 10 may be similar to the grill shown in U.S. Pat. No. 8,367,977, the entire content of which is incorporated herein by reference in its entirety. Cooking slots 14 are oriented in a vertical direction and are configured to hold a food product 24. Once food product 24 is cooked, trap door 16, which includes a plurality of openings 48, is moved transversely or horizontally from a closed position to an open position where openings 48 permit cooked food product to fall under the influence of gravity onto food product delivery tray 18, or to exit cooking slot 14.

In the exemplary embodiment, vertical cooking grill 10 includes movable door system 22, which includes a flexible door 26, a top or movable rod 28 over which flexible door 26 extends or is draped, a pair of tracks 30 in which movable rod 28 slides between a first position 32 and a second position 34, a fixed rod 36, and a weight or other tensioner 38. Flexible door 26 is fabricated from a sheet of flexible, food grade material. In an exemplary embodiment, the food grade material is a sheet of Teflon.

Figure 3:
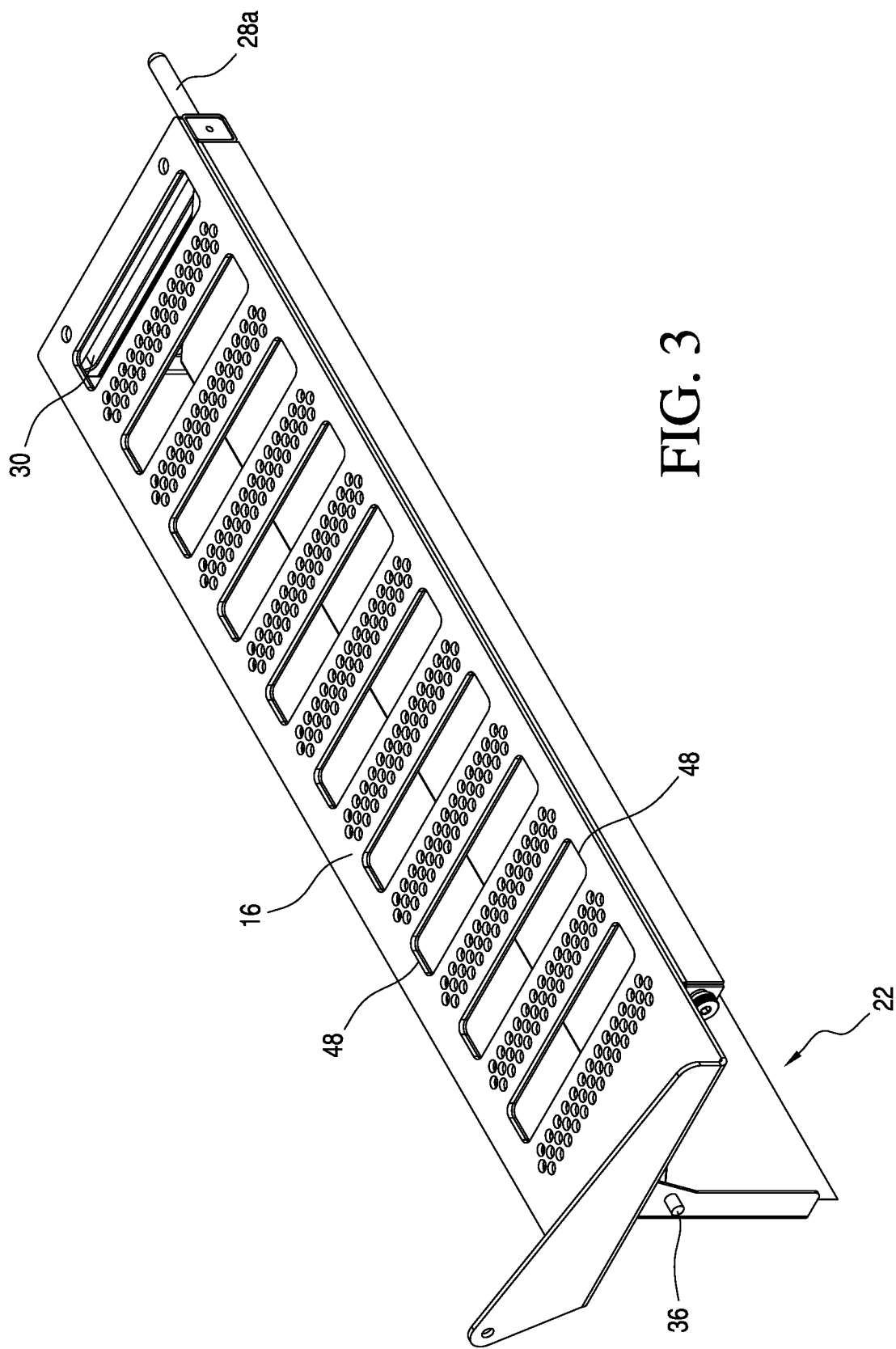
FIG. 3 is an upper perspective view of a slotted trap door of the vertical grill of FIG. 1 with a second exemplary embodiment moveable door of the present disclosure.
Figure 4:
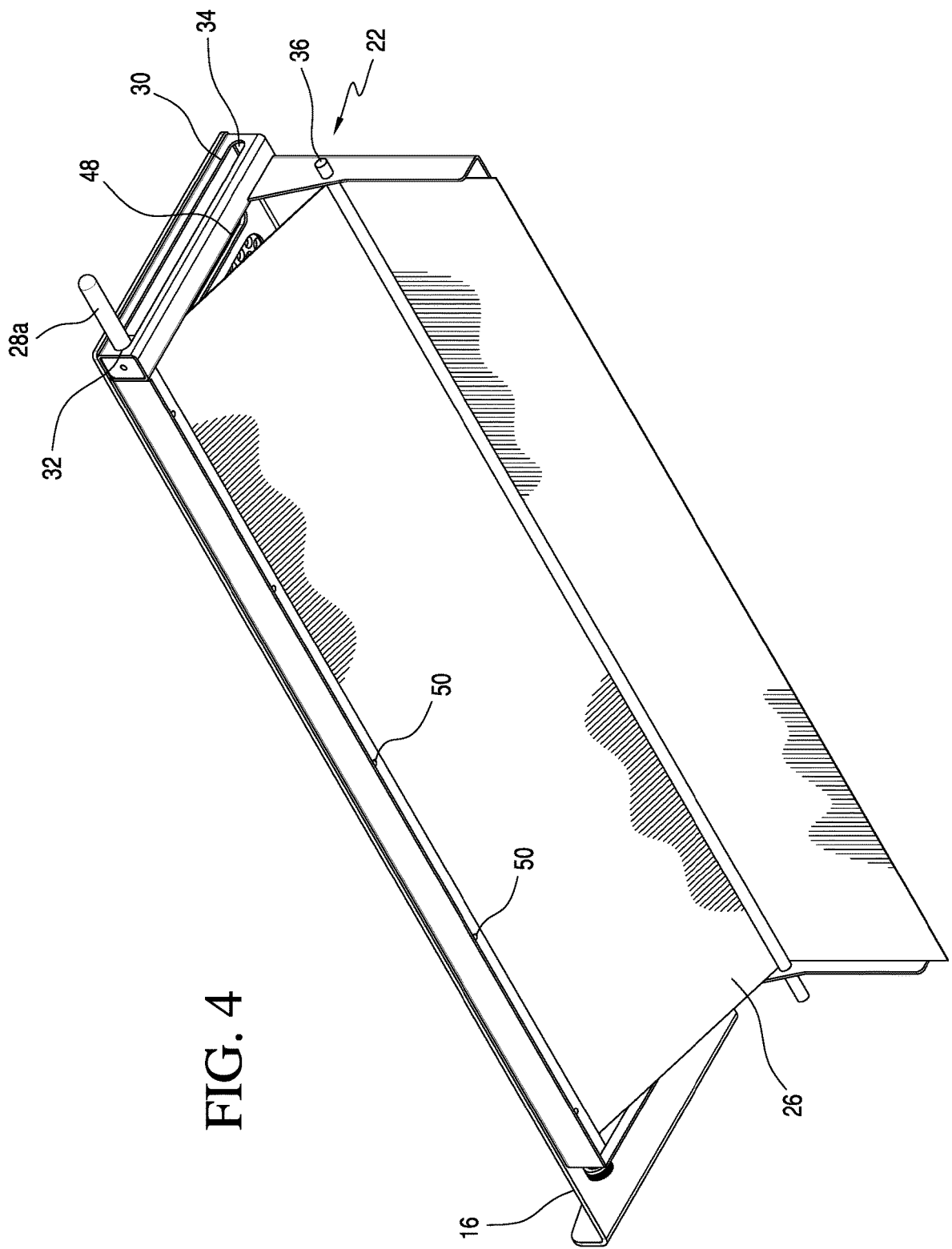
FIG. 4 is a lower perspective view the embodiment of FIG. 3.

In the exemplary embodiment of FIGS. 1 and 2, the sheet of Teflon is fixedly attached to vertical cooking grill at an anchor location 40, and then routed over movable rod 28, and then around fixed rod 36. In a second exemplary embodiment, shown in FIGS. 3 and 4, flexible door 26 is attached to moveable rod 28a, which thus becomes the anchor location in this embodiment. Such attachment may be by fasteners 50, which may be screws, rivets, bolts, etc., or through a mechanical arrangement, such as crimping or clamping. Tracks 30 are horizontally oriented and are attached to trap door 16 along a first or front side and along a second or back side in a location such that movable rod 28 presses the material of flexible door 26 against an underside of trap door 16 as movable rod 28 traverses from first position 32 to second position 34. The end of flexible door 26 that extends vertically below fixed rod 26 receives weight or other tensioner 38, which keeps flexible door 26 against movable rod 28 and fixed rod 36 as movable rod 28 moves between first position 32 and second position 34 along track 30 in FIGS. 1 and 2, and against fixed rod 36 as movable rod 28a moves between first position 32 and second position 34 along track 30 in FIGS. 3 and 4.

Movable rod 28 moves between first position 32 and second position 34 under the manual action of an operator, or by the power of an actuator (not shown). Movable rod 28 is shown in first position 32 in FIG. 1. When movable rod 28 is in first position 32, a direct vertical line or path between cooking slot 14 and food product receiving area 18 is blocked, as shown in FIG. 1. Because movable door 26 is interposed directly between cooking slot 14 and food receiving area 18, as food product 24 cooks, oil, grease, and other debris from the cooking process falls vertically onto trap door 16 and onto flexible door 26, when such debris falls through openings 48 in trap door 16. Liquid debris such as oil and/or grease flow onto flexible door 26. Once the cooking process is complete, an actuator changes the position of movable rod 28 from first position 32 to second position 34. As movable rod 28 traverses the underside of trap door 16, either movable rod 28 (FIGS. 3 and 4) or the proximity of flexible door 26 to the underside of trap door 16 by being between trap door 16 and moveable rod 28 (FIGS. 1 and 2) wipes oil, grease, and/or other debris from the underside of trap door 16, causing the oil and/or grease and other debris to flow along an upper angled surface 42 of flexible door 26 or through gaps in flexible door 26 adjacent to where flexible door 26 attaches to vertical cooking grill 10. Debris from the cooking process flows along a debris channel 44 located between a vertical portion of flexible door 26 that is vertically below or under fixed rod 36 and an interior or inner wall 46 of housing 12. The debris continues to flow vertically into grease pan 20, which is removed periodically for disposal of the debris and cleaning of grease pan 20.

As movable rod 28 traverses from first position 32 to second position 34, weight or tensioner 38 keeps flexible door 26 under tension, which enables flexible door 26 to maintain contact with movable rod 28 and fixed rod 36 as movable rod 28 traverses from first position 32 to second position 34, which thus moves flexible door 26, which is positioned vertically along a longitudinal line between cooking slots 14 and food product delivery tray 18 while food product 25 is cooking, into a position where flexible door 26 is no longer positioned vertically between or along a vertically extending longitudinal axis between cooking slots 14 and flexible door 26, as shown in FIG. 2. Once movable rod 28 is in second position 34, trap door 16 is actuated to move slots 48 in trap door 16 such that slots 48 are aligned with cooking slots 14, which permits cooked food product 24 to fall vertically onto food product delivery tray 18. Once food product has dropped vertically from cooking slots 14 into food product delivery tray 18, trap door 16 is closed, and movable rod 28 is restored to second position 34 from first position 32, and the cooking process is repeated with additional food product 24 delivered to cooking slots 14.

Trap door 16 and movable door system 22 are easily removable from vertical cooking grill 10 to permit cleaning of trap door 16 and the components of movable door system 22.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

We claim:
1. A cooking unit, comprising:
   a food product delivery area;
   a cooking slot including an upper opening and a lower opening; and
   a door between the food product delivery area and the lower opening of the cooking slot,
   wherein the door has a first end that is attached to a fixed anchor position, and
   wherein the door is routed around a first door support and a second door support, wherein the second door support is below the first door support, and
   wherein the door is movable between a first position to block a direct path from the cooking slot to the food product delivery area, and a second position where a path is provided for food product to move from the cooking slot to the food delivery area, and in the first position the door includes an angled surface that is at an angle with respect to a horizontal direction and the angled surface extends continuously from the first door support to the second door support,
   wherein the first door support is movable, and transverse movement of the first door support moves the door from the first position to the second position.

2. The cooking unit of claim 1, wherein the door is formed of a flexible, food grade material.

3. The cooking unit of claim 2, wherein the flexible food grade material is polytetrafluoroethylene.

4. The cooking unit of claim 1, wherein the second door support is fixed.

5. The cooking unit of claim 4, wherein during at least a portion of transverse movement of the first door support, the door contacts the second door support and an angle of the door changes.

6. The cooking unit of claim 4, wherein the door includes a portion that extends below the second door support in a direction that is toward the food product delivery area, and the cooking unit includes a grease receptacle positioned vertically below the portion of the door that extends below the second door support.

7. The cooking unit of claim 1, wherein the door includes a door section that is oriented at an angle to the angled surface, and as the door moves between the first position and the second position, the angle between the door section and the angled surface changes with movement of the door.

8. The cooking unit of claim 1, further comprising a trap door having a trap door slot positioned between the cooking slot and the door, wherein the trap door is movable between a first trap door position that secures food product in the cooking slot and a second trap door position that provides a path for food product to move downwardly from the cooking slot.

9. The cooking unit of claim 8, wherein the door is moved to the second position before the trap door is moved to the second trap door position.

10. The cooking unit of claim 8, wherein the trap door includes an underside, and a portion of the door is positioned to contact the underside of the trap door during movement from the door first position to the door second position.

11. The cooking unit of claim 1, wherein the door further comprises a second end that is below the second door support, and the unit further comprises a tensioner attached to the second end.

12. A cooking unit, comprising:
a food product delivery area;
a cooking slot including an upper opening and a lower opening; and
a door positioned between the food product delivery area and the lower opening of the cooking slot, wherein the door is made of a flexible, food grade material,
wherein the door is movable between a first position to block a direct path from the cooking slot to the food product delivery area, and a second position where a path is provided for food product to move from the cooking slot to the food delivery area, and in the first position the door includes an angled surface that is at an angle with respect to a horizontal direction and the angled surface extends continuously from a moveable first door support to a fixed second door support,
wherein transverse movement of the first door support moves the door from the first position to the second position, and
wherein the door comprises a lower end that is below the second door support, and the unit further comprises a tensioner attached to the lower end.

13. A cooking unit, comprising:
a food product delivery area;
a cooking slot including an upper opening and a lower opening;
a door positioned between the food product delivery area and the lower opening of the cooking slot; and
a trap door having a trap door slot between the cooking slot and the door, wherein the trap door is movable between a trap door first position that secures food product in the cooking slot and a second trap door position that provides a path for food product to move downwardly from the cooking slot,
wherein the door is movable between a door first position to block a direct path from the cooking slot to the food product delivery area, and a door second position where a path is provided for food product to move from the cooking slot to the food delivery area, and in the door first position the door includes an angled surface that is at an angle with respect to a horizontal direction and the angled surface extends continuously from a first door support to a second door support, and
wherein the trap door includes an underside, and a portion of the door is positioned to contact the underside of the trap door during movement from the door first position to the door second position.

\* \* \* \* \*